Patented Feb. 24, 1953

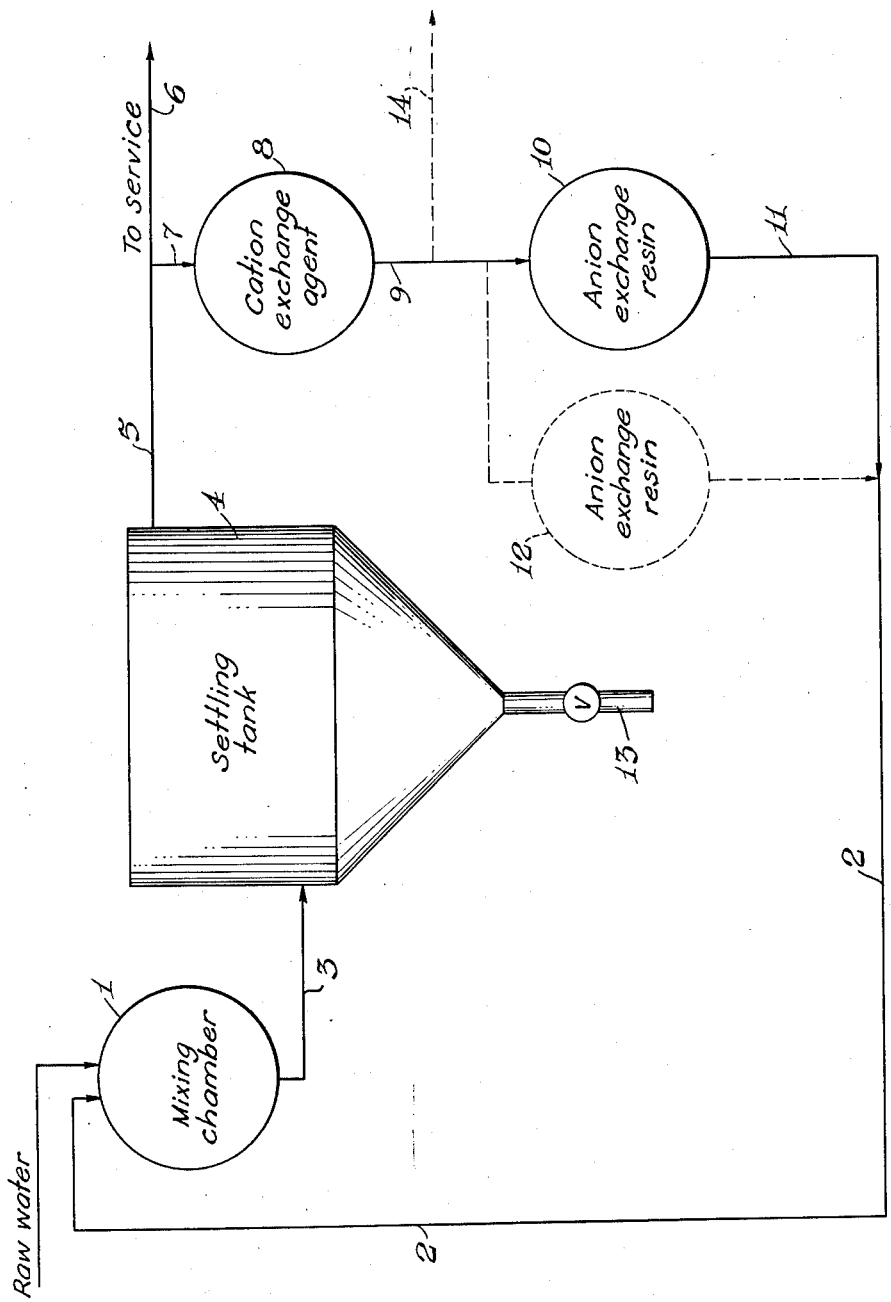

2,629,690

UNITED STATES PATENT OFFICE 2,629,690

METHOD OF REMOVING DISSOLVED SOLIDS FROM WATER

William C. Bauman, Midland, Mich., assignor to The Dow Chemical Company, Midland, Mich., a corporation of Delaware Application December 29, 1948, Serial No. 68,033

6 Claims. (Cl. 210—24)

This invention concerns an improved method for removing dissolved alkaline earth metal compounds, particularly alkaline earth salts of strong mineral acids, from water while at the same time reducing the total salt content of the water.

Hard waters are generally referred to as being permanently hard when the hardness is due to dissolved alkaline earth salts of strong mineral acids, e. g. chlorides or sulphates of calcium or magnesium, and as being temporarily hard when the hardness is due to alkaline earth metal bicarbonates. Frequently, both types of hardness occur in a single body of water, e. g. from lakes, wells, or streams, etc. In addition to the alkaline earth metal salts which cause hardness, natural waters often have a considerable content of other salts such as alkali metal chlorides, sulphates, carbonates, or bicarbonates, etc. In some areas, e. g. along seacoasts and in the southwestern part of the United States, water available in large quantities has a total salts content as high as, or higher than, may satisfactorily be tolerated for large scale purposes such as irrigation, household uses, or manufacturing operations, etc.

It is known to demineralize water by passing the same successively through a bed of an acidic form of a cation exchange agent and a basic form of an anion exchange agent, but such complete demineralization is too costly for the treatment of large quantities of water for general purposes such as irrigation or household uses. Temporary hardness is sometimes removed by a liming operation to cause precipitation of calcium carbonate, but this method is not effectual when the hardness is of a permanent character. It is known to remove permanent hardness in other ways, such as by passage of the water over an alkali metal salt of a cation exchange agent, or by treating the water successively with lime and an alkali metal carbonate, but these methods do not reduce, and frequently increase, the total molar concentration of salts in the water. There is need for an economical method for both softening and reducing the total salts content of water.

It is an object of this invention to provide a method of treating water which accomplishes both of the purposes just stated. More specifically, it is an object of this invention to provide an improved water-softening method which is effective in removing, or reducing, the permanent hardness of water and also in reducing the total salts content of the water. Other objects will be apparent from the following description of the invention.

According to this invention, water, containing alkaline earth metal salts of strong mineral acids, and usually other dissolved salts such as those hereinbefore mentioned, is softened by passing a stream of the water into and from a settling tank, or a reservoir, splitting the stream of effluent water so that one stream goes to service, i. e. to the points of use, passing the other stream through a bed of an alkali metal salt of a cation exchange agent, to remove the alkaline earth metal ions therefrom, and then through a bed of a carbonate of a strongly basic anion exchange agent so as to introduce carbonate ions into the water, feeding the thus-treated stream into admixture with the principal stream of raw water being fed to the settling tank, separating calcium carbonate from the water in the settling tank and withdrawing water therefrom having a decreased solids content.

The water flowing from the settling tank is saturated with calcium carbonate, i. e. it contains about 35 parts by weight of calcium carbonate per million parts of water. Accordingly, the water that is divided from the effluent flow from the settling tank and is to be contacted with the anion exchange resin is first passed through a bed of an alkali metal salt of a cation exchange agent to remove the alkaline earth metal ions. If the calcium ions are not removed from the water, prior to contacting the same with a bed of a carbonate of a strongly basic anion exchange resin, solid calcium carbonate may precipitate in the resin bed because of the increase in concentration of carbonate ions in the water therein and may cause gradual plugging of the resin bed or result in a gradual decrease in ion exchange capacity. The anions of the strong mineral acids, e. g. chloride and sulfate ions, in the water are absorbed by the strongly basic anion exchange resin in carbonate form with displacement of carbonate ions from the resin and into the water. The carbonate ions in the treated water chemically combine with calcium ions in the raw water, on mixing the two streams of water, and form calcium carbonate. The latter is then separated from the water by precipitation in the settling tank.

The proportion of the flow of effluent water from the settling chamber that is divided therefrom and contacted with the anion exchange resin in carbonate form may vary, depending upon the permanent hardness of the raw water, the amount of alkali metal compounds, e. g. sodium sulphate, dissolved therein, and the quality of water desired, i. e. the total salts content permissible in the water for a desired purpose. For instance, when the raw water contains only sodium sulphate and permanent hardness caused by calcium sulphate, a sufficient portion of the effluent water is recycled through the bed of cation exchange agent in sodium form, then through the anion exchange resin in carbonate form, and into admixture with the feed of raw water, to dissolve, in the recycled water, carbonate ions in amount corresponding approximately to the chemical equivalent of the calcium ions in the feed stream of raw water. Thus, when the raw water contains one from molecular proportion of calcium sulphate and sodium sulphate per million parts of water and substantially all of the calcium sulphate is to be converted to calcium carbonate, approximately 0.74 part by volume of the water flowing from the settling tank is recycled, as a side stream, through such beds of ion exchange agents and into admixture with the feed of raw water per part of the latter.

In instances in which the water to be purified contains alkaline earth metal bicarbonates as well as alkaline earth metal salts of strong mineral acids, the method as just described may be modified by splitting the stream of water flowing from the bed of cation exchange agent and passing one of the resultant streams through the subsequent set of steps set forth above, while at the same time passing the other stream through an hydroxide form of a strongly basic anion exchange resin and thence into admixture with the principal stream of raw water being fed to the settling tank.

The relative rates, on a volume basis, of flow of raw water to the system and of recycling streams of water through beds (consisting, respectively, of the basic anion exchange agent and of a carbonate of such agent) and into admixture with the feed of raw water, are controlled so as to introduce hydroxyl and carbonate ions from said beds into the water in amount such that the sum of the dissolved hydroxyl and carbonate ions corresponds to at least 80 per cent, preferably 100 per cent or more, of the chemical equivalent of the calcium salts in the raw feed water, the hydroxyl ions thus introduced being in amount corresponding to at least 80 per cent, preferably 100 per cent or more, of the chemical equivalent of the bicarbonate ions in the raw feed water. In instances in which the raw water contains magnesium salts, as well as the calcium salts just mentioned, hydroxyl ions may be introduced thereto in amount corresponding approximately to the sum of the chemical equivalent of the bicarbonate ions and the magnesium ions in the raw feed water.

Thus, if the raw water contains two gram molecular proportions of calcium sulfate, one gram molecular proportion of sodium sulphate and one-half gram molecular proportion of calcium bicarbonate, magnesium bicarbonate and magnesium sulphate, respectively, per million grams of water, a stream of the effluent water from the settling tank is passed through the bed of cation exchange agent in sodium form. The stream of water flowing from the cation exchange agent is divided and a flow corresponding to one-fourth of the stream is passed through the bed of a carbonate form of the anion exchange resin to introduce carbonate ions into the water, while the other three-fourths of the stream flowing from the cation exchange agent is passed through the bed of an hydroxide form of the anion exchange resin to introduce hydroxyl ions into the water. The thus-treated water flowing from the anion exchange resin beds is fed into admixture with the raw water entering the settling tank in the proportions of 0.65 part of the treated water containing hydroxyl ions and 0.22 part of the water containing carbonate ions, for each part of the raw water. When the raw water contains alkaline earth metal bicarbonates and alkaline earth metal compounds of strong mineral acids in proportions different from that just described, the proportion of water that is passed into contact with the separate beds of the basic form and carbonate form of the strongly basic anion exchange resin is adjusted so as to introduce into the separate streams of water an amount of hydroxyl ions and carbonate ions sufficient to chemically combine with the calcium and magnesium compounds in a predetermined proportion of the raw water and form calcium carbonate and magnesium hydroxide.

The accompanying drawing in the form of a diagrammatic flow sheet, illustrates certain ways in which the process may be carried out. The drawing is not to be construed as limiting the invention.

In the drawing, the raw water to be purified, i. e. containing dissolved salts such as calcium sulphate and sodium sulphate, is passed into vessel 1 where it is mixed with water containing dissolved carbonate ions fed thereto via line 2. The mixture of water then flows via line 3 into settling tank or chamber 4 where the calcium carbonate which is formed separates by settling. Water of reduced solids content flows from the settling tank 4 via outlet line 5 and is divided into two streams, one of which is withdrawn through line 6 to service or points of use. The other stream of effluent water passes via line 7 into contact with a bed 8 of an alkali metal salt of a cation exchange agent and flows therefrom through outlet line 9 into contact with a bed 10 of a carbonate of a strongly basic anion exchange resin. The treated water containing carbonate ions flows from bed 10 through outlet line 11 into line 2 and is fed into admixture with the raw water in mixing vessel 1. Calcium carbonate is removed from settling tank 4 through valved outlet 13.

The dotted lines in the drawing illustrate a modification of the process that may be employed when the water to be purified has both temporary and permanent hardness caused by dissolved alkaline earth metal compounds. In this instance, the stream of water flowing from the cation exchange agent through outlet line 9 may be split and one of the streams passed into contact with a bed 12 of the hydroxide form of a strongly basic anion exchange resin to introduce hydroxyl ions into the water, while at the same time the other stream of water is being contacted with a bed 10 of a carbonate of a strongly basic anion exchange resin. The treated water containing the introduced hydroxyl and carbonate ions flows from beds 10 and 12 into line 2 and is fed into admixture with the raw water in mixing vessel 1.

When the temporary hardness of the raw water is such that the bicarbonate ions are equal to or greater than the molecular proportion of calcium ions, only the hydroxide form of the anion exchange resin is used.

Dotted line 14 indicates an alternate conduit for withdrawing water to service or points of use. In the instance, when a softer water is desired, the total effluent flow of water from the settling tank 4 is passed through the cation exchange agent to remove the dissolved calcium carbonate. Thereafter, a part of the flow of water from the cation exchange agent is withdrawn to points of use through conduit 14. However, such method places a greater burden on the cation exchange agent so that more frequent regeneration of the cation exchange agent is necessary or a larger bed of the same may be required. When the dissolved calcium carbonate in the effluent water from the settling tank is not objectionable, it is more convenient and economical to withdraw the water to service through line 6.

Any of the usual cation exchange agents containing sulfonic acid radicals in alkali metal salt form, such as the sulfonated phenol-formaldehyde resins containing the sulfonic acid radicals attached to the aromatic nucleus or to an aliphatic portion of the molecule, sulfonated tannin-formaldehyde resins, or sulfonated copolymers of divinylbenzene and styrene, may be used in the process. The sulfonated phenol-formaldehyde resins such as Amberlite IR-1 and DOWEX-30 and the sulfonated copolymers of divinylbenzene and styrene are preferred.

The anion exchange resins to be used in the process should be strongly basic. Any anion exchange resin which, when added in its hydroxide form to a 1 normal aqueous sodium chloride solution brings the latter to a pH value of 10 or above is suitable for use in the process. In general, water-insoluble anion exchange resins which are quaternary ammonium bases are satisfactory. A number of such water-insoluble resinous quaternary ammonium bases are described in an application Serial No. 68,058 of G. D. Jones filed on even date herewith.

In brief, an anion exchange resin which is a quaternary ammonium base, or a salt thereof, may be prepared by reacting a halo-methylating agent such as chloromethyl methyl ether or bromomethyl methyl ether, with the normally solid higher polymers and copolymers of monovinyl-aromatic compounds, e. g. styrene, methyl styrene, chlorostyrene, vinylnaphthalene, etc., which copolymers frequently contain 20 per cent by weight or less of a polyvinyl-aromatic compound such as divinylbenzene, divinyltoluene, divinylnaphthalene, divinylxylene, etc., chemically combined, or interpolymerized, with the monovinyl - aromatic compound. The halomethylating reaction is carried out in the presence of a halo-methylating catalyst, e. g. zinc chloride, stannic chloride, aluminum chloride, tin, zinc, iron, etc., while the polymer is swollen by, or dissolved in, an organic liquid which is less reactive with the halo-methylating agent than is the polymer, such as an excess of the halo-methylating agent, to obtain a halo-methylated vinyl-aromatic resin having halomethyl radicals attached to its aromatic nuclei. Thereafter, the halo-methylated vinyl-aromatic resin is reacted with a tertiary amine, e. g. to form a quaternary ammonium halide.

The process of the invention may be carried out in any suitable apparatus, such as conventional water softening vessels constructed of iron or steel. Flow through the vessels may be by gravity or under pressure. The calcium carbonate may be separated from the water by precipitation in a settling basin, tank, chamber or precipitator such as is usually employed in water softening processes. A precipitator such as that described in the Water Conditioning Handbook, chapters 13 and 14, published in 1943 by The Permutit Company, New York city, may advantageously be employed in the process to separate the calcium carbonate from the water.

The following example illustrates practice of the invention, but is not to be construed as limiting the scope thereof.

*Example*

A stream of raw water having temporary and permanent hardness and containing one gram molecular weight of calcium bicarbonate and two gram molecular weights of calcium sulphate and sodium sulphate respectively, per million parts of water, is passed into a settling chamber. The water flowing from the settling chamber is divided into two streams. One of the streams is passed to service, i. e. withdrawn to the points of use, and the other stream of water is passed through a bed of DOWEX-30, a sulfonated phenol-formaldehyde resin, in sodium form to remove the calcium ions from the water. The stream of water flowing from the cation exchange resin is split into equal proportions. One of these streams of water is passed into contact with a bed of a strongly basic anion exchange resin containing quaternary ammonium hydroxide groups to introduce hydroxyl ions into the water. The other stream is passed through a bed of the same strongly basic anion exchange resin containing quaternary ammonium carbonate groups to introduce carbonate ions into the water. Said anion exchange resin consists of the reaction product of dimethylethanolamine with a chloromethylated copolymer of 85 parts by weight styrene, 9 parts ethylvinylbenzene and 6 parts divinylbenzene. The streams of treated water containing hydroxyl ions and carbonate ions are fed into admixture with a stream of the raw water to be purified, in proportions corresponding approximately to 0.42 part of the water containing carbonate ions and 0.42 part of the water containing hydroxyl ions for each part of the raw water. The mixed water is then passed into a settling chamber and the calcium carbonate separated therefrom by settling. The effluent water flowing from the settling chamber has a greatly reduced solids content as compared to the raw water. It is saturated with calcium carbonate but is softened and has a considerably lower total salt content, on a normality basis, than the raw water subjected to the treatment.

Other modes of applying the principle of the invention may be employed instead of those explained, change being made as regards the methods herein disclosed, provided the step or steps stated by any of the following claims or the equivalent of such stated step or steps be employed.

I claim:

1. A process for softening and decreasing the solids content of water having permanent hardness caused by dissolved calcium and magnesium compounds of strong mineral acids and containing alkali metal salts of strong mineral acids which comprises, mixing the raw water supply with a stream of the softened water containing an alkali metal carbonate and an alkali metal hydroxide in proportions corresponding approximately to the chemical equivalents, respectively, of the calcium compounds and the magnesium compounds causing permanent hardness in the raw water supply so that the permanent hardness is removed by the reaction of alkali metal carbonate and alkali metal hydroxide with the calcium and magnesium compounds and precipitation of calcium carbonate and magnesium hydroxide, respectively, leading the mixture into a settling tank, separating the precipitate, withdrawing softened water having a neutral to alkaline pH value and having a decreased solids content from the settling tank, passing one portion of the softened water to service, passing another portion of the softened water through a bed of an alkali metal salt of a cation exchange agent, dividing the stream of water flowing from the cation exchange agent and passing one of the streams of water into contact with a bed of a strongly basic anion exchange resin containing quaternary ammonium carbonate groups to introduce carbonate ions into the water while passing the other stream of water through a bed of a strongly basic anion exchange resin containing quaternary ammonium hydroxide groups to introduce hydroxyl ions into the water, and feeding the streams of thus-treated softened water containing alkali metal carbonate and alkali metal hydroxide into mixture with the raw water supply as the sole added ingredients to remove the permanent hardness.

2. A process for softening and decreasing the solids content of water having permanent hardness caused by dissolved calcium compounds of strong mineral acids and containing alkali metal salts of strong mineral acids which comprises, mixing the raw water supply with a stream of the softened water containing an alkali metal carbonate in a proportion corresponding approximately to the chemical equivalent of the calcium compounds causing permanent hardness in the raw water supply so that the permanent hardness is removed by reaction of the alkali metal carbonate with the calcium compounds and precipitation of calcium carbonate, leading the mixture into a settling tank, separating the precipitate, withdrawing softened water having a neutral to alkaline pH value and a decreased solids content from the settling tank, passing one portion of the softened water to service, contacting another portion of the softened water with a bed of a strongly basic anion exchange resin containing quaternary ammonium carbonate groups to introduce carbonate ions into the water and feeding the thus-treated softened water containing alkali metal carbonate into mixture with the raw water supply as the sole added ingredient to remove the permanent hardness.

3. A method as claimed in claim 1 wherein the strongly basic anion exchange resin consists of the reaction product of a vinyl-aromatic resin having halomethyl radicals attached to its aromatic nuclei and a tertiary alkyl amine.

4. A method as claimed in claim 1 wherein the strongly basic anion exchange resin consists of the reaction product of a vinyl-aromatic resin having halomethyl radicals attached to its aromatic nuclei and dimethylethanolamine.

5. A method as claimed in claim 1 wherein the strongly basic anion exchange resin consists of the reaction product of a vinyl-aromatic resin having halomethyl radicals attached to its aromatic nuclei and methyldiisopropanolamine.

6. A method as claimed in claim 2 wherein the strongly basic anion exchange resin consists of the reaction product of a vinyl-aromatic resin having halomethyl radicals attached to its aromatic nuclei and trimethylamine.

WILLIAM C. BAUMAN.

REFERENCES CITED

The following references are of record in the file of this patent:

UNITED STATES PATENTS

| Number | Name | Date |
|---|---|---|
| 1,683,967 | Foster | Sept. 11, 1928 |
| 2,206,007 | Liebknecht | June 25, 1940 |
| 2,223,930 | Griessbach et al. | Dec. 3, 1940 |
| 2,259,169 | Little | Oct. 14, 1941 |
| 2,294,764 | Urbain et al. | Sept. 1, 1942 |
| 2,341,907 | Cheetham et al. | Feb. 15, 1944 |
| 2,392,105 | Sussman | Jan. 1, 1946 |
| 2,404,367 | Durant et al. | July 23, 1946 |
| 2,471,213 | Higgins | May 24, 1949 |

OTHER REFERENCES

Booth: "Water Softening and Treatment" pages 19–26, published by Archibald Constable & Co., Ltd. London 1906.